Feb. 18, 1930. F. W. ELWORTHY 1,747,355
SPEEDOMETER LIGHT
Filed Nov. 24, 1928

INVENTOR.
Frederick W. Elworthy
BY Robt. D. Pearson
ATTORNEY.

Patented Feb. 18, 1930

1,747,355

UNITED STATES PATENT OFFICE

FREDERICK W. ELWORTHY, OF LOS ANGELES, CALIFORNIA

SPEEDOMETER LIGHT

Application filed November 24, 1928. Serial No. 321,721.

This invention relates to speedometers, and the general object of the invention is to provide a speedometer which will automatically indicate by a visual signal, such as a flash of light, when a vehicle on which the speedometer is mounted travels at a predetermined speed.

A more particular object is to provide an adjustable signal on a speedometer for indicating different speeds at which a vehicle may travel.

Other objects and advantages will appear hereinafter.

The invention is illustrated in the annexed drawing which forms a part of this specification and in which—

Corresponding parts are designated by the same reference characters in all the figures.

Figure 1:
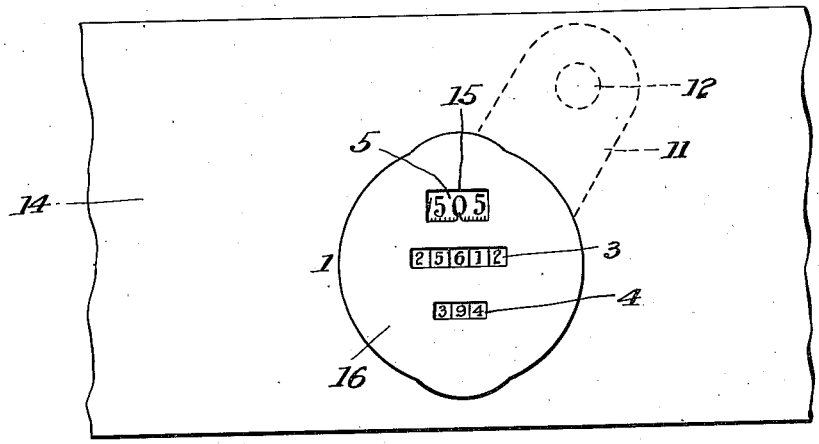
Fig. 1 is a face view of a speedometer embodying my invention.

In the drawing is illustrated a conventional automobile speedometer designated 1 which includes the casing 2, distance indicating wheels 3 and 4 and speed indicating wheel 5.

In the rim 6ª of the speed indicating wheel 5 I provide a light opening 7 over which extends a transparent speed indicating scale member 8, the rim being provided with an annular groove 9 in its periphery in which the scale member 8 is frictionally fitted so that it may be shifted circumferentially to bring different numbers on the scale into registration with said opening 7 according to the speed desired to be signalled. The upper wall of the casing 2 is provided with a light opening 10 which communicates with a light chamber 11 built on the upper part of the speedometer casing 2, in which chamber is mounted an electric light 12 controlled by an electric circuit 13.

The said rim 6ª is slidably mounted upon the wheel rim 6, as shown, to provide for the desired speed adjustment between said rims 6 and 6ª and scale 8, as hereinafter more fully described.

Figure 2:
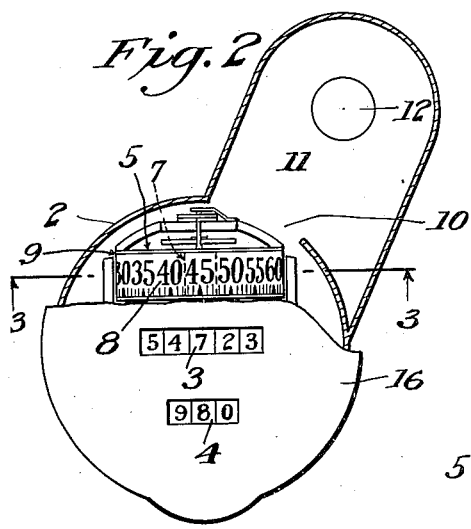
Fig. 2 is an enlarged plan partly in section of the speedometer shown in Fig. 1.
Figure 4:
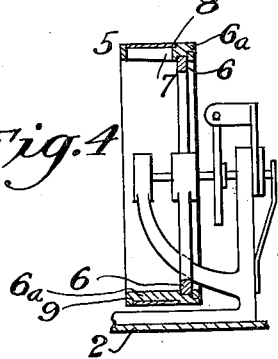
Fig. 4 is a vertical section taken on line 4—4 of Fig. 3.
Figure 5:
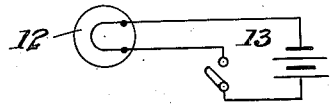
Fig. 5 is a diagram of the light circuit.
Figure 3:
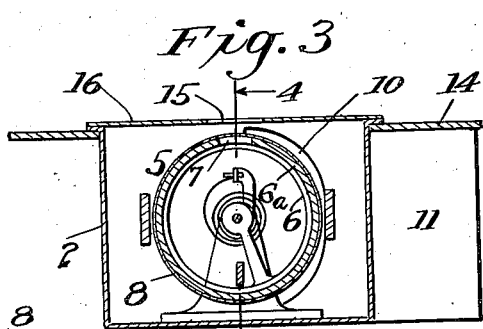
Fig. 3 is a transverse vertical sectional view of my invention taken on line 3—3 of Fig. 2.

To adjust the desired miles per hour to be signaled by the speedometer light, the wheel rim 6 and scale member 8 are held stationary while the opening 7 in the rim 6ª is slidably turned to register beneath the desired miles per hour upon the scale member 8, and after the wheel 5 is again balanced and recalibrated the speedometer will signal to the driver of the automobile the speed attained which may be forty-five miles per hour as shown in Fig. 2.

The speedometer may be mounted in the usual manner on the instrument board 14 of an automobile with the light chamber 11 under said board.

The number on the speed scale 8 over the light opening 7 in the rim of the speed wheel 5 is the number of miles per hour and the speed limit which it is desired to signal when the automobile on which the speedometer is mounted travels at such speed. The circuit 13 is first closed, and when the automobile travels at a predetermined speed limit, the speed wheel 5 is rotated in the usual manner until such speed limit on the indicating scale 8, which may be 45 miles per hour, and the opening 7 in the rim of the speed wheel 5, register with the speed opening 15 in the front wall 16 of the speedometer casing 2, whereupon light is projected by the electric light 12 through light chamber 11, opening 10 into the speed wheel 5, and through the speed wheel rim opening 7, transparent scale 8 and opening 15 in the front wall of the speedometer casing, thus signalling and indicating the speed limit through said opening 15.

I claim as my invention:

1. In combination, a transparent speed scale member for a speedometer, an electric light, and means for projecting the rays of said light through a predetermined number of said scale representing a predetermined speed.

2. In a speedometer, a speed wheel provided with an opening in its rim, a transparent speed scale member surrounding the periphery of said wheel rim with a predetermined number on said member over said opening, and means for projecting a light through said opening and scale when said number and opening register with the speed opening in the face of the speedometer.

3. In a speedometer, a speed wheel provided with an opening in its rim, a transparent speed scale member surrounding the periphery of said rim so that it may be shifted to bring different numbers of the scale into register with said opening, and means for projecting a light outwardly through said opening and said scale when said opening and the scale number over it register with the speed opening of the speedometer.

4. In a speedometer, a speed wheel provided with an opening in its rim, a transparent scale member extending across said opening and having inscribed thereon over said opening a speed indicating number, there being another opening in said speed wheel to admit light thereinto, and a lamp to supply light through the last recited opening to illuminate said speed indicating number when said opening in the rim of said speed wheel registers with the speed opening in the face of the speedometer.

In testimony whereof I hereunto affix my signature.

FREDERICK W. ELWORTHY.